(12) United States Patent
Slater et al.

(10) Patent No.: US 11,080,293 B2
(45) Date of Patent: Aug. 3, 2021

(54) APPARATUS, METHODS, AND SYSTEMS FOR TRACKING AND ACCOUNTING FOR DATA FLOW IN A LOAN PROCESSING SYSTEM

(71) Applicant: TOYOTA MOTOR NORTH AMERICA, INC., Plano, TX (US)

(72) Inventors: Robert D. Slater, Murphy, TX (US); Felipe G. Salles, Garland, TX (US)

(73) Assignee: TOYOTA MOTOR NORTH AMERICA, INC., Plano, TX (US)

( * ) Notice: Subject to any disclaimer, the term of this patent is extended or adjusted under 35 U.S.C. 154(b) by 242 days.

(21) Appl. No.: 16/151,962

(22) Filed: Oct. 4, 2018

(65) Prior Publication Data

US 2020/0110828 A1    Apr. 9, 2020

(51) Int. Cl.
*G06F 16/25* (2019.01)

(52) U.S. Cl.
CPC .................................. *G06F 16/254* (2019.01)

(58) Field of Classification Search
None
See application file for complete search history.

(56) References Cited

U.S. PATENT DOCUMENTS

| | | | |
|---|---|---|---|
| 8,639,593 B1 * | 1/2014 | Gallagher | G06Q 40/02 705/30 |
| 9,847,994 B1 * | 12/2017 | Kelly | H04L 63/067 |
| 2011/0238566 A1 * | 9/2011 | Santos | G06Q 40/025 705/38 |
| 2016/0371771 A1 | 12/2016 | Serrano et al. | |
| 2018/0018723 A1 | 1/2018 | Nagla et al. | |
| 2018/0114205 A1 * | 4/2018 | Thomas | G06Q 40/02 |
| 2018/0143995 A1 | 5/2018 | Bailey et al. | |
| 2018/0158139 A1 * | 6/2018 | Krajicek | G06Q 40/025 |
| 2018/0165758 A1 * | 6/2018 | Saxena | G06Q 20/405 |
| 2018/0183768 A1 | 6/2018 | Lobban et al. | |
| 2018/0260888 A1 * | 9/2018 | Paolini-Subramanya | G06Q 20/4016 |
| 2019/0272591 A1 * | 9/2019 | Leonard | H04L 9/088 |

(Continued)

FOREIGN PATENT DOCUMENTS

| | | |
|---|---|---|
| AU | 2017101413 A4 | 11/2017 |
| CN | 107146152 A | 9/2017 |
| CN | 107403372 A | 11/2017 |

(Continued)

*Primary Examiner* — Uyen T Le
(74) *Attorney, Agent, or Firm* — Haynes and Boone, LLP

(57) ABSTRACT

Apparatus, systems, and methods for auditing (i.e., tracking and accounting for) the flow of data within a loan processing system. The method generally includes aggregating loan data in one or more databases. The aggregation of the loan data is tracked using a blockchain. The aggregated loan data is normalized in a data warehouse. The normalization of the aggregated loan data is tracked using the blockchain. The aggregated and normalized loan data is queried and, in response to querying the aggregated and normalized loan data, the following information is displayed in a human-readable format: the loan data and tracking data. The tracking data is based on: the blockchain's tracking of the aggregation of the loan data; and the blockchain's tracking of the normalization of the aggregated loan data. The loan data includes at least one of loan origination data or loan payment data.

9 Claims, 8 Drawing Sheets

(56) References Cited

U.S. PATENT DOCUMENTS

2019/0379642 A1* 12/2019 Simons .................. G06N 20/00
2020/0211105 A1* 7/2020 Du ....................... G06Q 40/025

FOREIGN PATENT DOCUMENTS

| CN | 107508806 A | 12/2017 |
| CN | 107705203 A | 2/2018 |
| WO | 2017205902 A1 | 12/2017 |

* cited by examiner

FIG. 4A

APPARATUS, METHODS, AND SYSTEMS FOR TRACKING AND ACCOUNTING FOR DATA FLOW IN A LOAN PROCESSING SYSTEM

TECHNICAL FIELD

The present disclosure relates generally to loan processing and, more particularly, to apparatus, systems, and methods for tracking and accounting for data flow in a loan processing system.

BACKGROUND

Under certain regulatory standards (e.g., the Basel standards), financial institutions are required to disclose how loan-making and other financial decisions are made. Accordingly, when auditing occurs, significant effort is involved in tracking how loan data was obtained, stored, and/or transformed (e.g., analyzed) by a financial institution as it passed from one computing node within the financial institution to another. Many existing systems require storage of the loan data itself together with tracking data in a separate system to satisfactorily comply with an audit. As a result, such systems substantially increase data storage requirements and cost for the financial institution. It would therefore be desirable to simplify the auditing of loans and to make it easier and less costly for financial institutions to comply with the complex governmental regulations in this area (e.g., the Basel standards). Therefore, what is needed is an apparatus, system, and/or method that addresses one or more of the foregoing issues, and/or one or more other issues.

SUMMARY

The present disclosure provides apparatus, systems, and methods for auditing (i.e., tracking and accounting for) data flow in a loan processing system. A generalized method for auditing loan data includes aggregating, using an ingestion engine, loan data in one or more databases. The ingestion engine's aggregation of the loan data is tracked using a blockchain. The aggregated loan data is normalized in a data warehouse using a transform engine. The transform engine's normalization of the aggregated loan data is tracked using the blockchain. The aggregated and normalized loan data is queried using an interface engine. In response to querying the aggregated and normalized loan data, the interface engine displays, in a human-readable format, the queried loan data and tracking data, wherein the tracking data is based on the blockchain's tracking of the aggregation of the loan data and the blockchain's tracking of the normalization of the aggregated loan data.

A generalized system for auditing loan data includes an ingestion engine adapted to aggregate loan data in one or more databases. A transform engine is adapted to normalize the aggregated loan data in a data warehouse. A blockchain is adapted to track the ingestion engine's aggregation of the loan data and the transform engine's normalization of the aggregated loan data. An interface engine is adapted to query the aggregated and normalized loan data. Moreover, in response to querying the aggregated and normalized loan data, the interface engine is adapted to display, in a human-readable format, the queried loan data and tracking data, wherein the tracking data is based on the blockchain's tracking of the ingestion engine's aggregation of the loan data and the blockchain's tracking of the transform engine's normalization of the aggregated loan data.

A generalized apparatus for auditing loan data includes a non-transitory computer readable medium and a plurality of instructions stored on the non-transitory computer readable medium and executable by one or more processors. The plurality of instructions include instructions that, when executed, cause the one or more processors to aggregate, using an ingestion engine, loan data in one or more databases. The plurality of instructions also include instructions that, when executed, cause the one or more processors to normalize, using a transform engine, the aggregated loan data in a data warehouse. The plurality of instructions also include instructions that, when executed, cause the one or more processors to track, using a blockchain, the ingestion engine's aggregation of the loan data and the transform engine's normalization of the aggregated loan data. The plurality of instructions also include instructions that, when executed, cause the one or more processors to query, using an interface engine, the aggregated and normalized loan data. Finally, the plurality of instructions also include instructions that, when executed, cause the one or more processors, in response to querying the aggregated and normalized loan data, to display, using the interface engine, in a human-readable format, the queried loan data and tracking data, wherein the tracking data is based on the blockchain's tracking of the aggregation of the loan data and the blockchain's tracking of the normalization of the aggregated loan data.

BRIEF DESCRIPTION OF THE DRAWINGS

FIG. 4A is a graphical view of at least a portion of a loan application receivable by an origination engine of the loan processing system of FIG. 3, according to one or more embodiments of the present disclosure.

DETAILED DESCRIPTION

The present disclosure applies blockchain technology to "tag" loan data so that it can be tracked by authorized personnel within a financial institution and, when necessary, shared with regulators. In particular, the manner in which loan data flows within the financial institution is tracked and analyzed through the use of a private blockchain-one that is accessible to authorized personnel within the company but not to outsiders. The loan data in this private blockchain is then made available to regulators as needed. As loan data moves from one computing node to another (or is in some way transformed), that "transaction" is recorded reliably and immutably in the private blockchain. Thus, the asset being managed via the distributed digital ledger (the blockchain) is the loan data itself (e.g., loan origination data, loan payment data, etc.), which loan data follows a specific path through a loan processing system. The specific path may include many transformations of the loan data (e.g., signatures, analysis, summaries, aggregation, normalization, etc.) as the loan data flows through the loan processing system. The private blockchain's hash functions link these transformations of the loan data together in blocks to provide a simple way to verify that loan data has not been tampered with, as will be described in further detail below. As a result, the present disclosure greatly simplifies the auditing of loans and makes it easier for financial institutions to comply with the complex government regulations in this area (e.g., the Basel standards).

Figure 1:
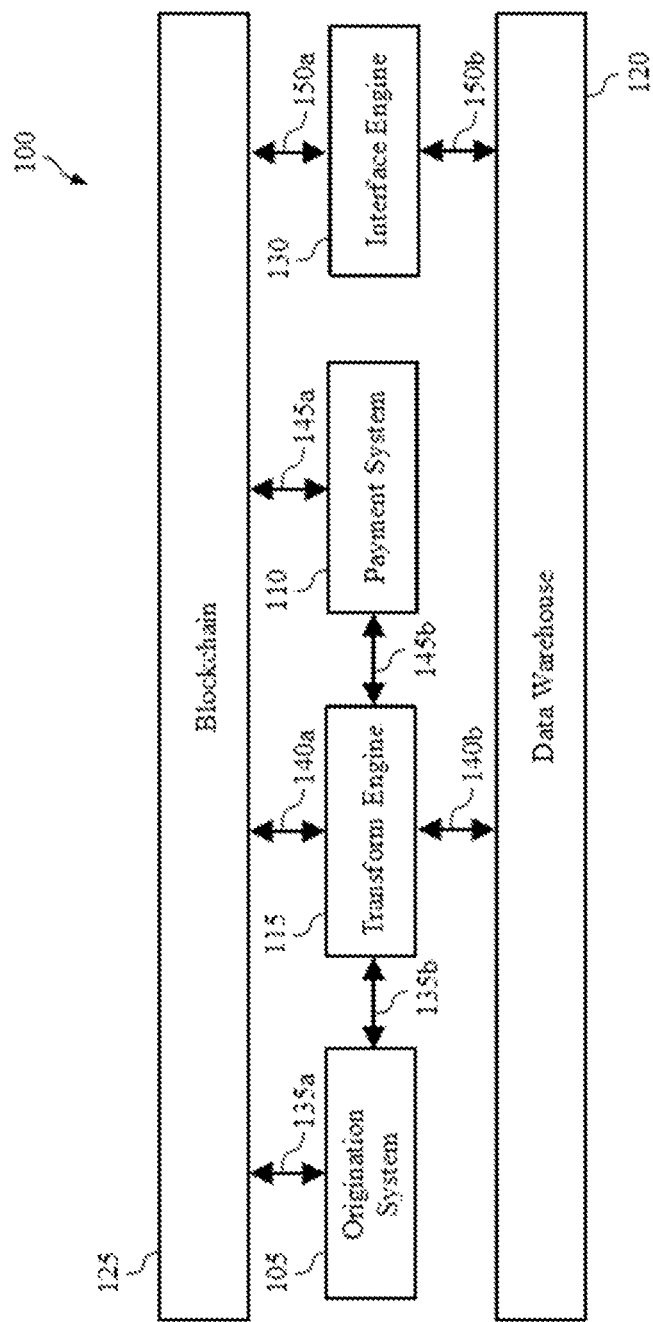
FIG. 1 is a diagrammatic view of a loan processing system, according to one or more embodiments of the present disclosure.

Referring to FIG. 1, in an embodiment, a loan processing system is generally referred to by reference numeral 100 and includes an origination system 105, a payment system 110, a transform engine 115, a data warehouse 120, a blockchain 125, and an interface engine 130. The origination system 105, which communicates with the blockchain 125 and the transform engine 115, as indicated by arrows 135a and 135b, respectively, is adapted to receive and aggregate loan origination data from various sources. The transform engine 115, which communicates with the blockchain 125 and the data warehouse 120, as indicated by arrows 140a and 140b, respectively, is adapted to receive the aggregated loan origination data from the origination system 105, normalize the data (e.g., into third normal form), and communicate the normalized data to the data warehouse 120. The payment system 110, which communicates with the blockchain 125 and the transform engine 115, as indicated by arrows 145a and 145b, respectively, is adapted to receive and aggregate loan payment data from various sources. In addition to receiving the aggregated loan origination data from the origination system 105, the transform engine 115 also receives the aggregated loan payment data from the payment system 110, normalizes the data (e.g., into third normal form), and communicates the normalized data to the data warehouse 120. In some embodiments, the normalization of the loan origination data and the loan payment data by the transform engine 115 improves database processing and reduces data storage costs. The interface engine 130, which communicates with the blockchain 125 and the data warehouse 120, as indicated by arrows 150a and 150b, respectively, is adapted to display a variety of information (e.g., loan information, data tracking information, etc.) to a user upon request, as will be described in further detail below.

Figure 2:
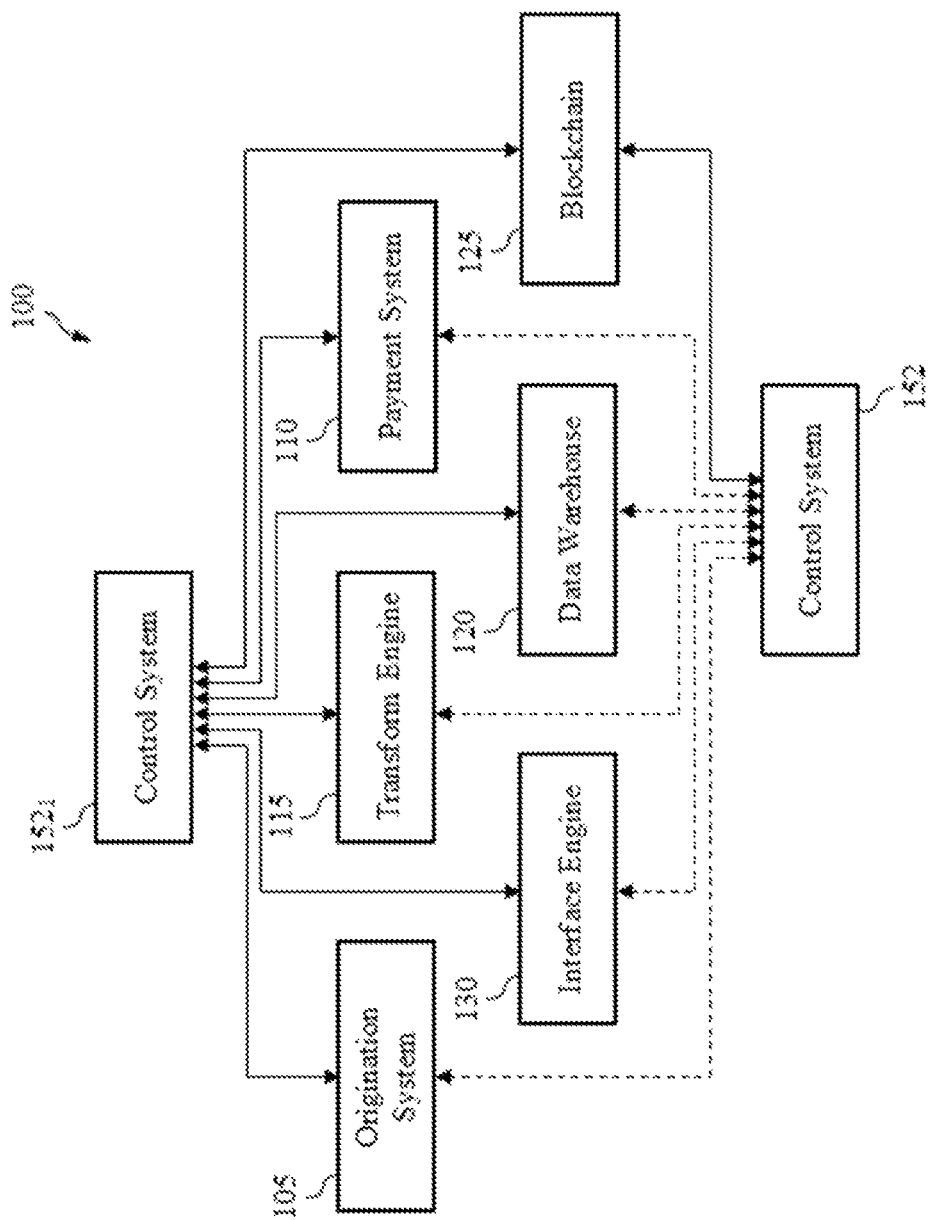
FIG. 2 is another diagrammatic view of the loan processing system of FIG. 1 including control system(s) in communication with various components thereof, according to one or more embodiments of the present disclosure.

Referring to FIG. 2, with continuing reference to FIG. 1, in an embodiment, the loan processing system 100 further includes a control system $152_1$ that communicates with the origination system 105, the payment system 110, the transform engine 115, the data warehouse 120, the blockchain 125, and/or the interface engine 130 to at least partially control the interaction of data with and between the various components of the loan processing system 100. In some embodiments, the loan processing system 100 further includes one or more additional control system(s) $152_i$ that communicate with the blockchain 125. The one or more additional control system(s) $152_i$ may also communicate with the origination system 105, the payment system 110, the transform engine 115, the data warehouse 120, and/or the interface engine 130 to at least partially control the interaction of data with and between the various components of the loan processing system 100, as indicated by dashed-line arrows in FIG. 2. In some embodiments, the origination system 105, the payment system 110, the transform engine 115, the data warehouse 120, the blockchain 125, and/or the interface engine 130 is/are, include, or is/are part of said control system(s) $152_{1-i}$. In some embodiments, two or more of the control systems $152_{1-i}$ communicate with one another via a network. In some embodiments, the two or more of the control systems $152_{1-i}$ that communicate with one another via the network act as computing nodes for verifying the accuracy of data blocks before the data blocks are added to the blockchain 125, as will be described in further detail below.

The term "engine" is meant herein to refer to an agent, instrument, or combination of either, or both, agents and instruments that may be associated to serve a purpose or accomplish a task-agents and instruments may include sensors, actuators, switches, relays, power plants, system wiring, computers, components of computers, programmable logic devices, microprocessors, software, software routines, software modules, communication equipment, networks, network services, and/or other elements and their equivalents that contribute to the purpose or task to be accomplished by the engine. Accordingly, some of the engines may be software modules or routines, while others of the engines may be hardware and/or equipment elements in communication with the origination database 160, the payment database 230, the data warehouse 120, and/or the blockchain 125.

Figure 3:
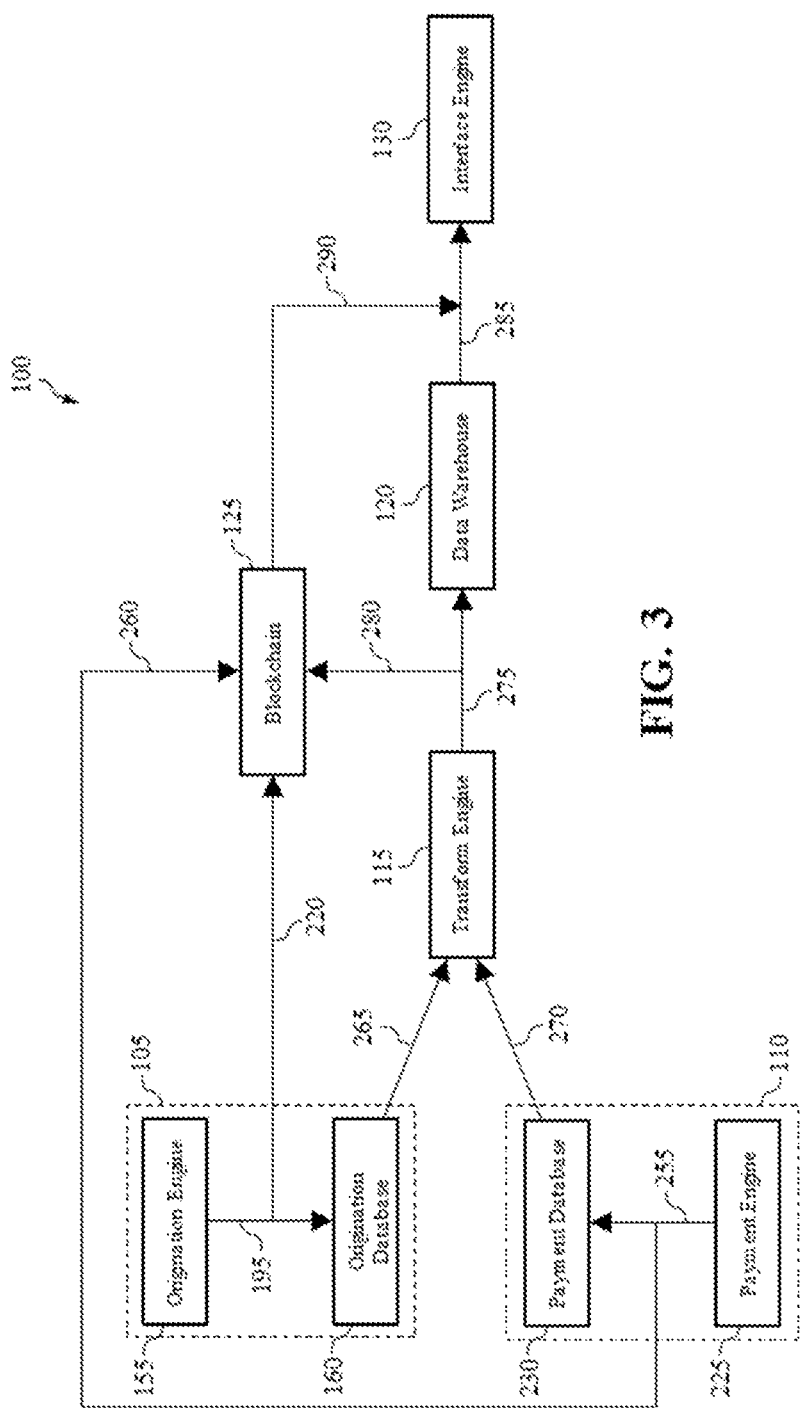
FIG. 3 is a diagrammatic view of the loan processing system of FIGS. 1 and 2 in operation, according to one or more embodiments of the present disclosure.

Referring to FIG. 3, with continuing reference to FIGS. 1 and 2, in an embodiment, the blockchain 125 is adapted to track and account for the flow of data within the loan processing system 100. More particularly, the blockchain 125 is adapted to track the origination system 105's aggregation of loan origination data, the payment system 110's aggregation of loan payment data, and the transform engine 115's normalization of the aggregated data (i.e., the aggregated loan origination data and the aggregated loan payment data). Subsequently, the blockchain 125 accounts for said aggregation (i.e., by the origination system 105 and the payment system 110) and normalization (i.e., by the transform engine 115) via the interface engine 130. The operation of the blockchain 125 to track and account for the flow of data within the loan processing system 100 will be described in further detail below.

Figure 4A:
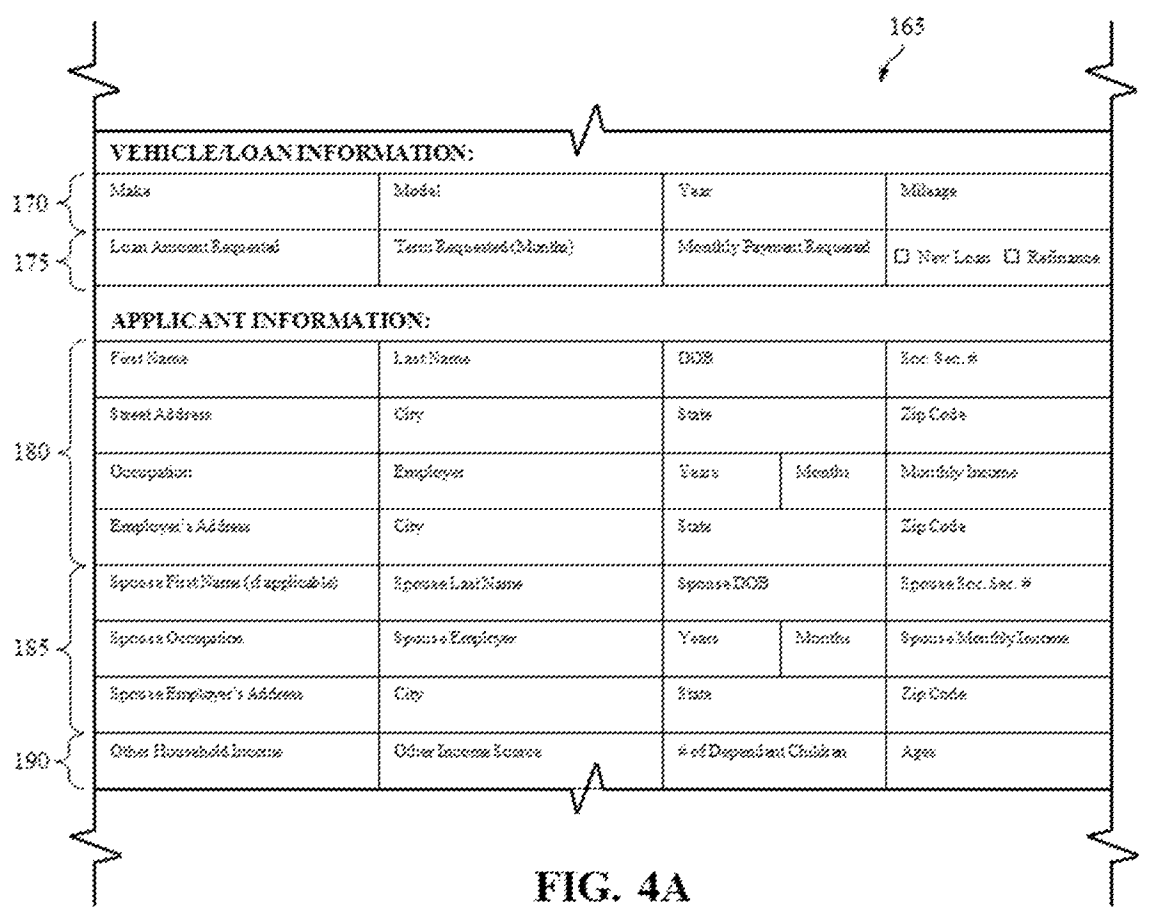

The origination system 105 includes an origination engine 155 and an origination database 160. The origination engine 155 is adapted to receive loan origination data from various sources. For example, as shown in FIG. 4A, the origination engine 155 may receive loan origination data (e.g., borrower, vehicle, and/or loan information) for a particular loan from a loan application 165. The loan application 165 may be filled out by, for example, the borrower, a representative of the car dealership from which the borrower is purchasing the vehicle, a representative of the financial institution from which the borrower is borrowing the funds, or the like. The loan application 165 may include, but is not limited to, the following information regarding the borrower make, model, year, and/or mileage of the vehicle purchased, as indicated by reference numeral 170; type (e.g., new loan or refinance), amount, term, and/or monthly payment of the loan, as indicated by reference numeral 175; borrower first name, borrower last name, borrower date of birth, borrower social security number, borrower street address, city, state, zip code, borrower occupation, borrower employer, borrower time of employment, borrower monthly income, and/or borrower employer's address, city, state, and zip code, as indicated by reference numeral 180; spouse first name, spouse last name, spouse date of birth, spouse social security number, spouse occupation, spouse employer, spouse time of employment, spouse monthly income, and/or spouse employer's address, city, state, and zip code, as indicated by reference numeral 185; and/or other household income, source of other income, and/or number of dependent children, and ages, as indicated by reference numeral 190. In some embodiments, although described as including the information indicated by the reference numerals 170, 175, 180, 185, and 190 in FIG. 4A, in addition, or instead, the loan application 165 may also include, but is not limited to, information regarding other debts (e.g., other car loans, mortgage loans, etc.), financial statements, bank statements, contact information, or other information relating to the borrower and/or his/her spouse, and/or any combination thereof. For another example, the origination engine 155 may receive loan origination data (e.g., borrower or spouse credit information) for a particular loan from a credit agency such as, for example, Experian®, Equifax®, and/or TransUnion®, or from another third party source.

Figure 4B:
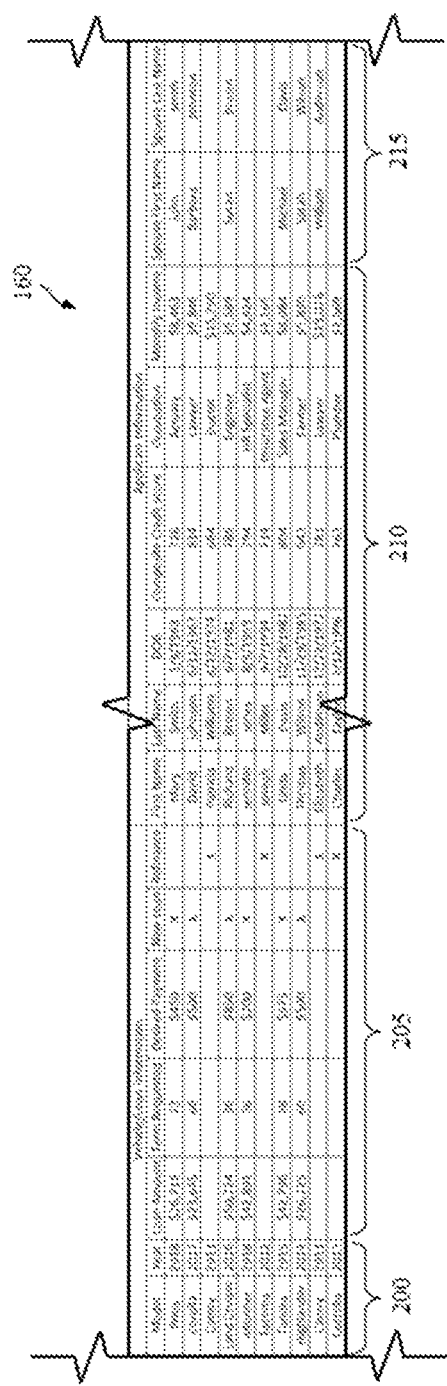
FIG. 4B is a graphical view of at least a portion of an origination database of the loan processing system of FIG. 3, according to one or more embodiments of the present disclosure.

The origination engine 155 is adapted to aggregate the loan origination data received for various borrowers in the origination database 160, as indicated by arrow 195 in FIG. 3. For example, as shown in FIG. 4B, the loan origination data aggregated in the origination database 160 for the various borrowers (e.g., Mary Smith, David Johnson, Patricia Williams, etc.) may include, but is not limited to: model and year of the vehicle purchased, as indicated by reference numeral 200; type (e.g., new loan or refinance), amount, term, and monthly payment of the loan, as indicated by reference numeral 205; borrower first name, borrower last name, borrower date of birth, borrower composite credit score, borrower occupation, and borrower monthly income, as indicated by reference numeral 210; and/or spouse first name and spouse last name, as indicated by reference numeral 215. The loan origination data aggregated in the origination database 160 for the various borrowers may also include any other information gathered by the origination engine 155 (e.g., borrower social security number, spouse monthly income, etc.). In addition to, or instead of, being aggregated in a single table, as shown in FIG. 4B, the loan origination data may be aggregated in a variety of different tables. For example, borrower first and last names may be aggregated in one table, borrower credit scores may be aggregated in another table, borrower incomes may be aggregated yet another table, borrower loan information 210 may be aggregated in yet another table, and so forth.

The blockchain 125 is adapted to track the origination system 105's aggregation of the loan origination data, as indicated by arrow 220 in FIG. 3. More particularly, for each individual datum (or group of data) communicated from the origination engine 155 to the origination database 160, the blockchain 125 creates a block and assigns an identifier to the block representing the datum. In particular, each identifier includes or is associated with a unique code such as, for example, a multiple digit numeric or alpha-numeric code identifying the datum. Moreover, each identifier includes or is otherwise associated with tracking information for the datum, which tracking information includes at least a trace denoting from where the origination engine 155 obtained the datum and a trace denoting a location in the origination database 160 in which the obtained datum was stored upon aggregation. In some embodiments, one or more of the identifier, the first trace, and/or the second trace is/are, includes, or is/are part of the blockchain 125's hash function. The blockchain 125 may be configured to create blocks in a variety of different ways. For example, the blockchain 125 may be configured to create separate blocks in which identifiers are assigned to the borrower's composite credit score and/or date of birth (e.g., Thomas Wilson's composite credit score, Jennifer Jones' date of birth) (shown in FIG. 4B). For another example, the blockchain 125 may be configured to create separate blocks in which identifiers are assigned to a particular borrower's vehicle information 200 and/or loan information 205 (e.g., Linda Davis' vehicle information 200, Patricia Williams' loan information 205) (shown in FIG. 4B). However, the grouping (or non-grouping) of individual datums into blocks by the blockchain 125 can be varied drastically without departing from the scope of the present disclosure.

Figure 4C:
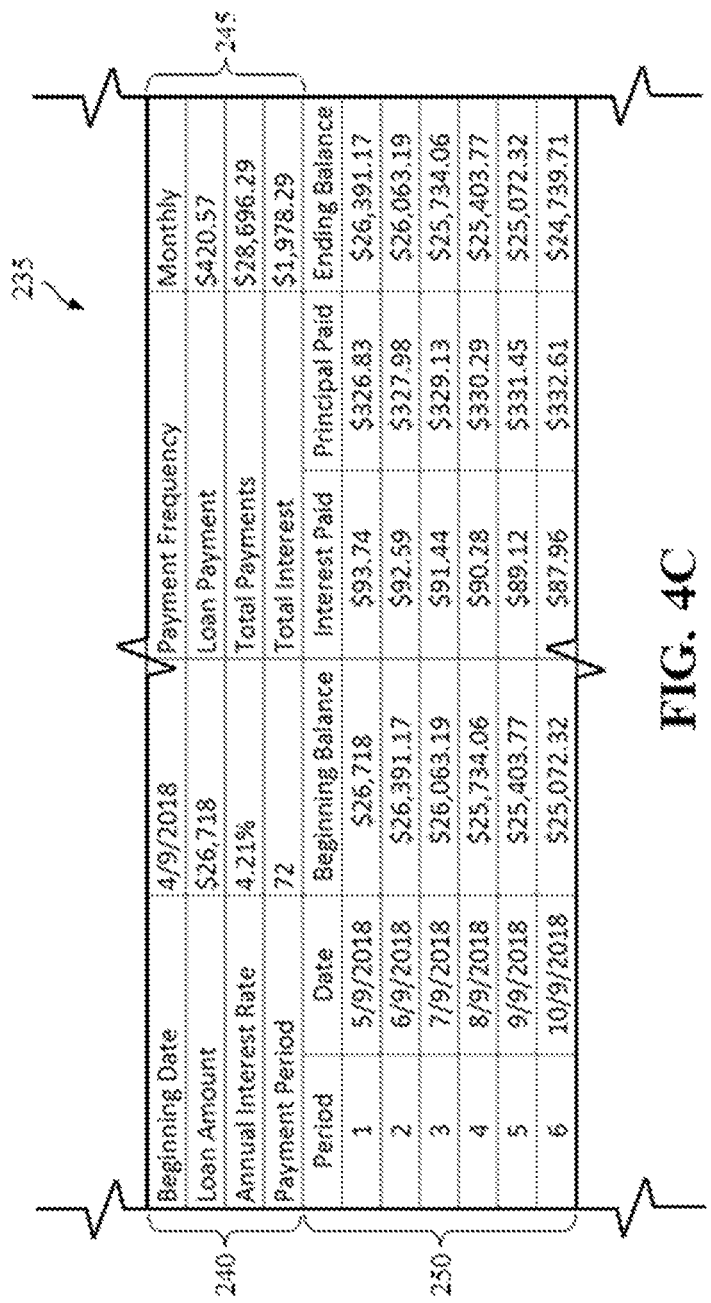
FIG. 4C is a graphical view of at least a portion of a loan statement receivable by a payment engine of the loan processing system of FIG. 3, according to one or more embodiments of the present disclosure.

Turning back again to FIG. 3, the payment system 110 includes a payment engine 225 and a payment database 230. The origination engine 155 and the payment engine 225, in combination, may be referred to herein as an "ingestion engine." The payment engine 225 is adapted to receive loan payment data from various sources. For example, as shown in FIG. 4C, the payment engine 225 may receive loan payment data for a particular loan from a loan statement 235. The loan statement 235 may be automatically generated periodically by, for example, the financial institution from which the borrower borrowed the funds. The loan statement 235 may include, but is not limited to, the following information regarding the loan: the beginning date, loan amount, interest rate, and/or payment periods of the loan, as indicated by reference numeral 240; the payment frequency, payment amount, total payments, and/or total interest of the loan, as indicated by reference numeral 245; and/or the payment history of the loan, including, but not limited to, the period, date, beginning balance, interest paid, principle paid, and/or ending balance for each payment, as indicated by reference numeral 250. In some embodiments, although described as including the information indicated by the reference numerals 240, 245, and 250 in FIG. 4C, in addition, or instead, the loan statement 235 may include, but is not limited to, information regarding advance payments, bank statements, or other information relating to repayment of the particular loan to which the loan statement 235 pertains, and/or any combination thereof.

The payment engine 225 is adapted to aggregate the loan payment data received for various loans in the payment database 230, as indicated by arrow 255 in FIG. 3. The loan payment data aggregated in the payment database 230 for the various loans may include any information gathered by the payment engine 225. Moreover, the loan payment data may be aggregated in a variety of different tables in the payment database 230. For example, borrower first and last names may be aggregated in one table, borrower payment histories 250 may be aggregated in another table, borrower loan information 240 may be aggregated in yet another table, and so forth.

The blockchain 125 is adapted to track the payment system 110's aggregation of loan payment data, as indicated by arrow 260 in FIG. 3. More particularly, for each individual datum (or group of data) communicated from the payment engine 225 to the payment database 230, the blockchain 125 creates a block and assigns an identifier to the block representing the datum. In particular, each identifier includes or is associated with a unique code such as, for example, a multiple digit numeric or alpha-numeric code identifying the datum. Moreover, each identifier includes or is otherwise associated with tracking information for the datum, which tracking information includes at least a trace denoting from where the payment engine 225 obtained the datum and a trace denoting a location in the payment database 230 in which the obtained datum was stored upon aggregation. In some embodiments, one or more of the identifier, the first trace, and/or the second trace is/are, includes, or is/are part of the blockchain 125's hash function. The blockchain 125 may be configured to create blocks in a variety of different ways. For example, the blockchain 125 may be configured to create separate blocks in which identifiers are assigned to each of a particular borrower's vehicle information 200 and/or loan information 205. However, the grouping (or non-grouping) of individual datums into blocks by the blockchain 125 can be varied drastically without departing from the scope of the present disclosure.

The transform engine 115 is adapted to receive the aggregated loan origination data from the origination database 160, as indicated by arrow 265 in FIG. 3. Moreover, the transform engine 115 is adapted to receive the aggregated loan payment data from the payment database 230, as indicated by arrow 270 in FIG. 3. After receiving the aggregated loan origination data and loan payment data, the transform engine 115 is adapted to normalize the aggregated loan origination data and loan payment data (e.g., into third normal form) and communicate the normalized data to the data warehouse 120, as indicated by arrow 275 in FIG. 3. As used herein, the term "normalize" is used to describe the process of organizing data in a database. This includes creating tables and establishing relationships between those tables according to rules designed both to protect the data and to make the database more flexible by eliminating redundancy and inconsistent dependency. Redundant data wastes storage space and creates maintenance problems. For example, if data that exists in more than one place must be changed, the data must be changed in exactly the same way in all locations. Moreover, because the path to find the data may be missing or broken, inconsistent dependencies can make data difficult to access. As mentioned above, in some embodiments, the normalization of the loan origination data and the loan payment data by the transform engine 115 improves database processing and reduces data storage costs.

In this regard, a database is said to be in "first normal form" if the following rules are observed: repeating groups within individual tables are eliminated; a separate table is created for each set of related data; and each set of related data is identified with a primary key. For example, the transform engine 115's normalization of the aggregated loan origination data and loan payment data into first normal form may involve, for example, eliminating repeating information within the origination database 160 and/or the payment database 230, creating separate tables in the data warehouse 120 for a particular borrower's vehicle information 200 and/or payment history 250, and identifying each of the separate tables with a primary key. Further, a database is said to be in "second normal form" if, in addition to the rules governing first normal form, the following additional rules are observed: separate tables are created for sets of values that apply to multiple records; and these tables are related with a foreign key. Further still, a database is said to be in "third normal form" if, in addition to the rules governing first normal form and second normal form, the following additional rule is observed: fields that do not depend on the primary key are eliminated. Although other levels of normalization are possible, third normal form is the highest level necessary for most applications.

The blockchain 125 is adapted to track the transform engine 115's normalization of the aggregated loan origination data and loan payment data, as indicated by arrow 280 in FIG. 3. More particularly, for each individual datum (or group of data) communicated from the transform engine 115 to the data warehouse 120, the blockchain 125 creates a block and assigns an identifier to the block representing the datum. In particular, each identifier includes or is associated with a unique code such as, for example, a multiple digit numeric or alpha-numeric code identifying the datum. Moreover, each identifier includes or is otherwise associated with tracking information for the datum, which tracking information includes at least a trace denoting from where the transform engine 115 obtained the datum and a trace denoting a location in the data warehouse 120 in which the obtained datum was stored upon normalization. In some embodiments, one or more of the identifier, the first trace, and/or the second trace is/are, includes, or is/are part of the blockchain 125's hash function. The blockchain 125 may be configured to create blocks in a variety of different ways. However, the grouping (or non-grouping) of individual datums into blocks by the blockchain 125 can be varied drastically without departing from the scope of the present disclosure.

The interface engine 130 is adapted to query at least a portion of the aggregated and normalized loan origination data and loan payment data from the data warehouse 120, as indicated by arrow 285 in FIG. 3. More particularly, for each individual borrower (or group of borrowers) in the data warehouse 120, the interface engine 130 may query at least a portion of the aggregated and normalized loan origination data and loan payment data from the data warehouse 120. In response to the interface engine 130's query, as indicated by arrow 290 in FIG. 3, the blockchain 125 is adapted to account for: the origination system 105's aggregation of loan origination data (represented by the arrow 220), the payment system 110's aggregation of loan payment data (represented by the arrow 260), and/or the transform engine 115's normalization of the aggregated loan origination data and loan payment data (represented by the arrow 280). More particularly, for each individual datum (or group of data) communicated from the data warehouse 120 to the interface engine 130, the blockchain 125 searches for block(s) associated with the datum and communicates said block(s) to the interface engine 130.

In some embodiments, the block(s) communicated to the interface engine 130 in response to the interface engine 130's query may include, but is/are not limited to: the block to which the identifier representing the communication of the datum from the origination engine 155 to the origination database 160 is assigned, which identifier includes or is associated with the unique code such as, for example, the multiple digit numeric or alpha-numeric code identifying the datum, and the tracking information for the datum, which tracking information includes at least the trace denoting from where the origination engine 155 obtained the datum and the trace denoting the location in the origination database 160 in which the obtained datum was stored upon aggregation; the block to which the identifier representing the communication of the datum from the payment engine 225 to the payment database 130 is assigned, which identifier includes or is associated with the unique code such as, for example, the multiple digit numeric or alpha-numeric code identifying the datum, and the tracking information for the datum, which tracking information includes at least the trace denoting from where the payment engine 225 obtained the datum and the trace denoting the location in the payment database 230 in which the obtained datum was stored upon aggregation; and/or the block to which the identifier representing the communication of the datum from the transform engine 115 to the data warehouse 120 is assigned, which identifier includes or is associated with the unique code such as, for example, the multiple digit numeric or alpha-numeric code identifying the datum, and the tracking information for the datum, which tracking information includes at least the trace denoting from where the transform engine 115 obtained the datum and the trace denoting the location in the data warehouse 120 in which the obtained datum was stored upon normalization.

In response to the blockchain 125's communication of the block(s) to the interface engine 130, the interface engine 130 is adapted to display, in a human-readable format, the queried loan data and tracking data, wherein the tracking data is based on the block(s) communicated to the interface engine 130. The interface engine 130 includes at least one input and output device or system that enables a user to interact with the origination system 105, the payment system 110, the transform engine 115, the data warehouse 120, and/or the blockchain 125 (e.g., via the control system(s) $152_{1-i}$) and the functions that these component(s) provide. In several embodiments, the interface engine 130 includes at least a graphical user-interface. However, the interface engine 130 may have multiple user stations, which may each include a video display, a keyboard, a pointing device, a document scanning/recognition device, or other device(s) configured to receive an input from an external source, which may be connected to a software process operating as part of a computer or local area network. The interface engine 130 may include externally positioned equipment configured to input data into the control system(s) $152_{1-i}$. Data entry may be accomplished through various forms, including raw data entry, data transfer, or document scanning coupled with a character recognition process, for example. The interface engine 130 may include a user station that has a display with touch-screen functionality, so that a user may receive information (e.g., via the control system(s) $152_{1-i}$) from the origination system 105, the payment system 110, the transform engine 115, the data warehouse 120, and/or the blockchain 125 and provide input to said component(s) directly via the display or touch screen. Other examples of sub-components that may be part of the interface engine 130 include, but are not limited to, audible alarms, visual alerts, telecommunications equipment, and computer-related components, peripherals, and systems.

Sub-components of the interface engine 130 may be positioned in various locations within an area of operation. Sub-components of the interface engine 130 may also be remotely located away from the general area of operation, for example, at a financial institution's office, at a dealership's office, and/or in a borrower's mobile phone. A wide variety of technologies would be suitable for providing coupling of various sub-components of the interface engine 130 (and the interface engine 130 itself) to the control system(s) $152_{1-i}$. In several embodiments, the operator may thus be remote from the interface engine 130, such as through a wireless or wired internet connection, or a portion of the interface engine 130 may be remote from the area of operation, and be proximate a remote operator, and the portion thus connected through, e.g., an internet connection, to the remainder of the on-site components of the interface engine 130.

Figure 5:
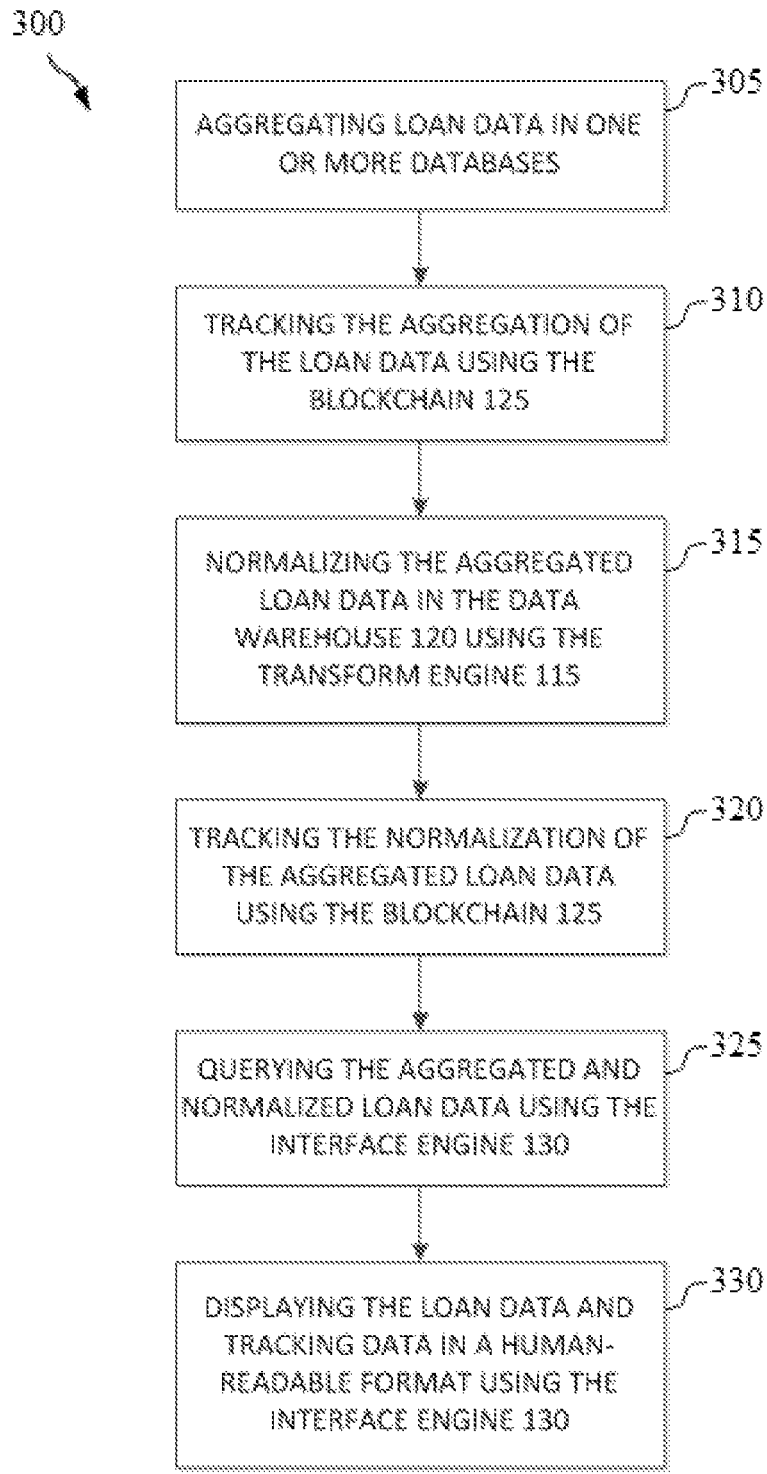
FIG. 5 is a flow diagram of a method for implementing one or more embodiments of the present disclosure.

Referring to FIG. 5, in an embodiment, a method of tracking and accounting for the flow of data within the loan processing system 100 is generally referred to by the reference numeral 300 and includes a step 305 of aggregating loan data in one or more databases. In some embodiments of the step 305, aggregating the loan data in the one or more databases includes aggregating a first data set (e.g., the loan origination data) in a first database (e.g., the loan origination database 160) using the origination engine 155. In some embodiments of the step 305, aggregating the loan data in the one or more databases further includes aggregating a second data set (e.g., the loan payment data) in a second database (e.g., the payment database 230) using the payment engine 225. At a step 310, the aggregation of the loan data is tracked using the blockchain 125. In some embodiments of the step 310, tracking, using the blockchain 125, the aggregation of the loan data in the one or more databases includes tracking the aggregation of the first data set (e.g., the loan origination data) in the first database (e.g., the loan origination database 160). In addition, or instead, in some embodiments of the step 310, tracking, using the blockchain 125, the aggregation of the loan data in the one or more databases may include tracking the aggregation of the second data set (e.g., the loan payment data) in the second database (e.g., the payment database 230). In some embodiments of the step 310, tracking, using the blockchain 125, the aggregation of the loan data includes: creating a first block having a first trace denoting a source from which the loan data was obtained and a second trace denoting a location in the one or more databases in which the obtained loan data was stored upon aggregation; and adding the first block to the blockchain 125. In some embodiments of the step 310, tracking, using the blockchain 125, the aggregation of the loan data further includes, prior to adding the first block to the blockchain 125, verifying, using multiple computing nodes in a network (e.g., the control systems $152_{1-i}$), the accuracy of the first block.

At a step 315, the aggregated loan data is normalized in the data warehouse 120 using the transform engine 115. In some embodiments of the step 315, normalizing the aggregated loan data in the data warehouse 120 includes normalizing the aggregated first data set (e.g., the loan origination data) with the aggregated second data set (e.g., the loan payment data) in the data warehouse 120. At a step 320, the normalization of the aggregated loan data is tracked using the blockchain 125. In some embodiments of the step 320, tracking, using the blockchain 125, the normalization of the aggregated loan data includes tracking the normalization of the aggregated first data set (e.g., the loan origination data) with the aggregated second data set (e.g., the loan payment data). In some embodiments of the step 320, tracking, using the blockchain 125, the normalization of the aggregated loan data includes: creating a second block having a third trace denoting the location in the one or more databases from which the aggregated loan data was obtained and a fourth trace denoting a location in the data warehouse 120 in which the obtained aggregated loan data was stored upon normalization; and adding the second block to the blockchain 125. In some embodiments of the step 320, tracking, using the blockchain 125, the normalization of the aggregated loan data further includes, prior to adding the second block to the blockchain 125, verifying, using the multiple computing nodes in the network (e.g., the control systems $152_{1-i}$), the accuracy of the second block. At a step 325, the aggregated and normalized loan data is queried using the interface engine 130. Finally, at a step 330, in response to querying the aggregated and normalized loan data, the following data is displayed in a human-readable format using the interface engine 130: the loan data; and tracking data. In some embodiments of the step 330, the tracking data is based on:

the blockchain 125's tracking of the aggregation of the loan data and the blockchain 125's tracking of the normalization of the aggregated loan data.

In some embodiments, the operation of the loan processing system 100 and/or the execution of the method greatly simplifies the auditing of loans and makes it easier for financial institutions to comply with the complex government regulations in this area (e.g., the Basel standards).

Figure 6:
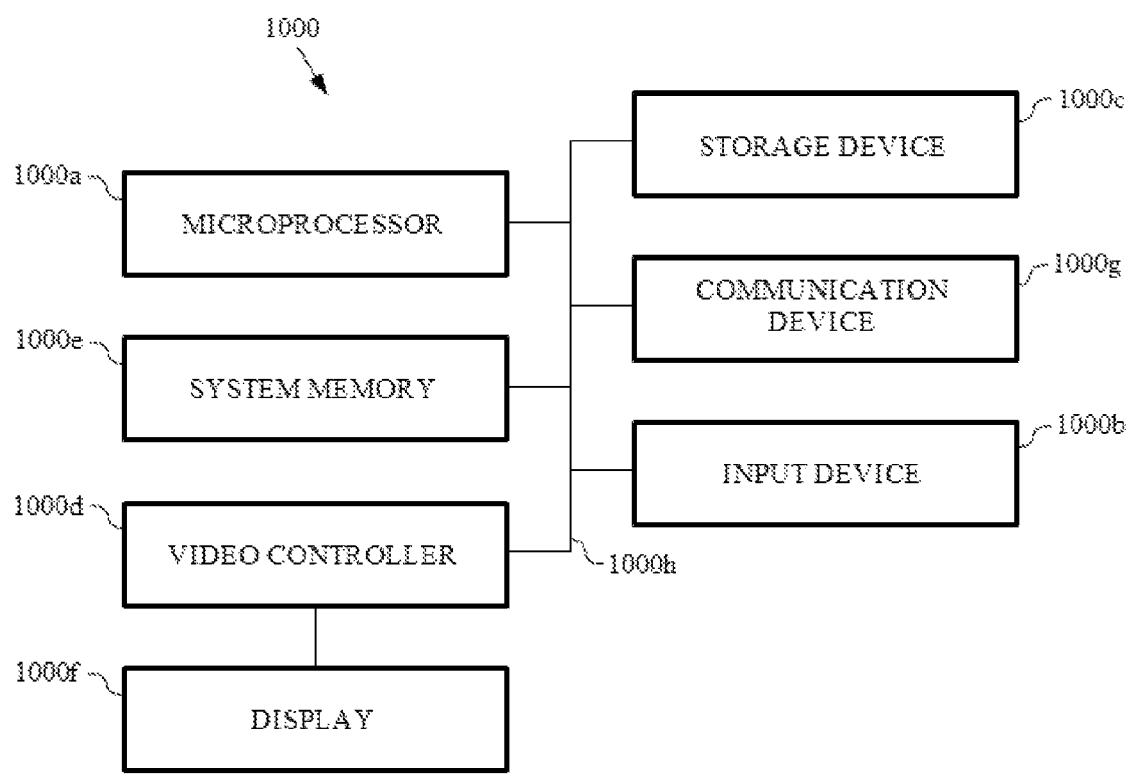
FIG. 6 is a diagrammatic illustration of a computing node for implementing one or more embodiments of the present disclosure.

Referring to FIG. 6, in an embodiment, a computing node 1000 for implementing one or more embodiments of one or more of the above-described elements, engines (e.g., 115, 130, 155, and/or 225), databases (e.g., 120, 160, and/or 230), systems (e.g., 100, 105, and/or 110), methods (e.g., 300), and/or steps (e.g., 305, 310, 315, 320, 325, and/or 330), and/or any combination thereof, is depicted. The node 1000 includes a microprocessor 1000*a*, an input device 1000*b*, a storage device 1000*c*, a video controller 1000*d*, a system memory 1000*e*, a display 1000*f*, and a communication device 1000*g* all interconnected by one or more buses 1000*h*. In several embodiments, the storage device 1000*c* may include a floppy drive, hard drive, CD-ROM, optical drive, any other form of storage device and/or any combination thereof. In several embodiments, the storage device 1000*c* may include, and/or be capable of receiving, a floppy disk, CD-ROM, DVD-ROM, or any other form of computer-readable medium that may contain executable instructions. In several embodiments, the communication device 1000*g* may include a modem, network card, or any other device to enable the node 1000 to communicate with other nodes. In several embodiments, any node represents a plurality of interconnected (whether by intranet or Internet) computer systems, including without limitation, personal computers, mainframes, PDAs, smartphones and cell phones.

In several embodiments, one or more of the components of any of the above-described systems include at least the node 1000 and/or components thereof, and/or one or more nodes that are substantially similar to the node 1000 and/or components thereof. In several embodiments, one or more of the above-described components of the node 1000 and/or the above-described systems include respective pluralities of same components.

In several embodiments, a computer system typically includes at least hardware capable of executing machine readable instructions, as well as the software for executing acts (typically machine-readable instructions) that produce a desired result. In several embodiments, a computer system may include hybrids of hardware and software, as well as computer sub-systems.

In several embodiments, hardware generally includes at least processor-capable platforms, such as client-machines (also known as personal computers or servers), and hand-held processing devices (such as smart phones, tablet computers, personal digital assistants (PDAs), or personal computing devices (PCDs), for example). In several embodiments, hardware may include any physical device that is capable of storing machine-readable instructions, such as memory or other data storage devices. In several embodiments, other forms of hardware include hardware sub-systems, including transfer devices such as modems, modem cards, ports, and port cards, for example.

In several embodiments, software includes any machine code stored in any memory medium, such as RAM or ROM, and machine code stored on other devices (such as floppy disks, flash memory, or a CD ROM, for example). In several embodiments, software may include source or object code. In several embodiments, software encompasses any set of instructions capable of being executed on a node such as, for example, on a client machine or server.

In several embodiments, combinations of software and hardware could also be used for providing enhanced functionality and performance for certain embodiments of the present disclosure. In an embodiment, software functions may be directly manufactured into a silicon chip. Accordingly, it should be understood that combinations of hardware and software are also included within the definition of a computer system and are thus envisioned by the present disclosure as possible equivalent structures and equivalent methods.

In several embodiments, computer readable mediums include, for example, passive data storage, such as a random access memory (RAM) as well as semi-permanent data storage such as a compact disk read only memory (CD-ROM). One or more embodiments of the present disclosure may be embodied in the RAM of a computer to transform a standard computer into a new specific computing machine. In several embodiments, data structures are defined organizations of data that may enable an embodiment of the present disclosure. In an embodiment, a data structure may provide an organization of data, or an organization of executable code.

In several embodiments, any networks and/or one or more portions thereof, may be designed to work on any specific architecture. In an embodiment, one or more portions of any networks may be executed on a single computer, local area networks, client-server networks, wide area networks, internets, hand-held and other portable and wireless devices and networks.

In several embodiments, a database may be any standard or proprietary database software, such as Oracle, Microsoft Access, SyBase, or DBase II, for example. In several embodiments, the database may have fields, records, data, and other database elements that may be associated through database specific software. In several embodiments, data may be mapped. In several embodiments, mapping is the process of associating one data entry with another data entry. In an embodiment, the data contained in the location of a character file can be mapped to a field in a second table. In several embodiments, the physical location of the database is not limiting, and the database may be distributed. In an embodiment, the database may exist remotely from the server, and run on a separate platform. In an embodiment, the database may be accessible across the Internet. In several embodiments, more than one database may be implemented.

In several embodiments, a plurality of instructions stored on a computer readable medium may be executed by one or more processors to cause the one or more processors to carry out or implement in whole or in part the above-described operation of each of the above-described elements, engines (e.g., 115, 130, 155, and/or 225), databases (e.g., 120, 160, and/or 230), systems (e.g., 100, 105, and/or 110), methods (e.g., 300), and/or steps (e.g., 305, 310, 315, 320, 325, and/or 330), and/or any combination thereof. In several embodiments, such a processor may include one or more of the microprocessor 1000*a*, any processor(s) that are part of the components of the above-described systems, and/or any combination thereof, and such a computer readable medium may be distributed among one or more components of the above-described systems. In several embodiments, such a processor may execute the plurality of instructions in connection with a virtual computer system. In several embodiments, such a plurality of instructions may communicate directly with the one or more processors, and/or may interact with one or more operating systems, middleware, firmware, other applications, and/or any combination thereof, to cause the one or more processors to execute the instructions.

A method for auditing loan data has also been disclosed. The method generally includes aggregating, using an ingestion engine, loan data in one or more databases; tracking, using a blockchain, the ingestion engine's aggregation of the loan data; normalizing, using a transform engine, the aggregated loan data in a data warehouse; tracking, using the blockchain, the transform engine's normalization of the aggregated loan data; querying, using an interface engine, the aggregated and normalized loan data; and in response to querying the aggregated and normalized loan data, displaying, using the interface engine, in a human-readable format: the queried loan data; and tracking data, wherein the tracking data is based on: the blockchain's tracking of the aggregation of the loan data; and the blockchain's tracking of the normalization of the aggregated loan data.

The foregoing method embodiment may include one or more of the following elements, either alone or in combination with one another:

- Aggregating, using the ingestion engine, the loan data in the one or more databases includes aggregating a first data set in a first database; and tracking, using the blockchain, the ingestion engine's aggregation of the loan data in the one or more databases includes tracking the aggregation of the first data set in the first database.
- Aggregating, using the ingestion engine, the loan data in the one or more databases further includes aggregating a second data set in a second database; and tracking, using the blockchain, the ingestion engine's aggregation of the loan data in the one or more databases further includes tracking the aggregation of the second data set in the second database.
- The first data set includes one of: loan origination data and loan payment data; and the second data set includes the other of: loan origination data and loan payment data.
- Normalizing, using the transform engine, the aggregated loan data in the data warehouse includes normalizing the aggregated first data set with the aggregated second data set in the data warehouse; and tracking, using the blockchain, the transform engine's normalization of the aggregated loan data includes tracking the normalization of the aggregated first data set with the aggregated second data set.
- Tracking, using the blockchain, the ingestion engine's aggregation of the loan data includes: creating a first block having a first trace denoting a source from which the loan data was obtained and a second trace denoting a location in the one or more databases in which the obtained loan data was stored upon aggregation; and adding the first block to the blockchain; and tracking, using the blockchain, the transform engine's normalization of the aggregated loan data includes: creating a second block having a third trace denoting the location in the one or more databases from which the aggregated loan data was obtained and a fourth trace denoting a location in the data warehouse in which the obtained aggregated loan data was stored upon normalization; and adding the second block to the blockchain.
- Tracking, using the blockchain, the ingestion engine's aggregation of the loan data further includes, prior to adding the first block to the blockchain, verifying, using multiple computing nodes in a network, the accuracy of the first block; and tracking, using the blockchain, the transform engine's normalization of the aggregated loan data further includes, prior to adding the second block to the blockchain, verifying, using the multiple computing nodes in the network, the accuracy of the second block.

A system for auditing loan data has also been disclosed. The system generally includes an ingestion engine adapted to aggregate loan data in one or more databases; a transform engine adapted to normalize the aggregated loan data in a data warehouse; a blockchain adapted to track the ingestion engine's aggregation of the loan data and the transform engine's normalization of the aggregated loan data; an interface engine adapted to: query the aggregated and normalized loan data; and in response to querying the aggregated and normalized loan data, display, in a human-readable format: the queried loan data; and tracking data, wherein the tracking data is based on: the blockchain's tracking of the ingestion engine's aggregation of the loan data; and the blockchain's tracking of the transform engine's normalization of the aggregated loan data.

The foregoing system embodiment may include one or more of the following elements, either alone or in combination with one another:

- The ingestion engine includes a first engine adapted to aggregate a first data set in a first database; and the blockchain is adapted to track the aggregation of the first data set in the first database.
- The ingestion engine further includes a second engine adapted to aggregate a second data set in a second database; and the blockchain is adapted to track the aggregation of the second data set in the second database.
- The first data set includes one of: loan origination data and loan payment data; and the second data set includes the other of: loan origination data and loan payment data.
- The transform engine is adapted to normalize the aggregated first data set with the aggregated second data set in the data warehouse; and the blockchain is adapted to track the normalization of the aggregated first data set with the aggregated second data set.
- To track the aggregation of the loan data, the blockchain is adapted to: create a first block having a first trace denoting a source from which the loan data was obtained and a second trace denoting a location in the one or more databases in which the obtained loan data was stored upon aggregation; and add the first block to the blockchain; and, to track the normalization of the aggregated loan data, the blockchain is adapted to: create a second block having a third trace denoting the location in the one or more databases from which the aggregated loan data was obtained and a fourth trace denoting a location in the data warehouse in which the obtained aggregated loan data was stored upon normalization; and add the second block to the blockchain.
- The system further includes multiple computing nodes forming a network and being adapted to: verify the accuracy of the first block prior to adding the first block to the blockchain; and verify the accuracy of the second block prior to adding the second block to the blockchain.

An apparatus for auditing loan data has also been disclosed. The apparatus generally includes a non-transitory computer readable medium; and a plurality of instructions stored on the non-transitory computer readable medium and executable by one or more processors, the plurality of instructions including: instructions that, when executed, cause the one or more processors to aggregate, using an ingestion engine, loan data in one or more databases; instructions that, when executed, cause the one or more processors to normalize, using a transform engine, the aggregated loan data in a data warehouse; instructions that, when executed, cause the one or more processors to track, using a blockchain, the ingestion engine's aggregation of the loan data and the transform engine's normalization of the aggregated loan data; instructions that, when executed, cause the one or more processors to query, using an interface engine, the aggregated and normalized loan data; and instructions that, when executed, cause the one or more processors, in response to querying the aggregated and normalized loan data, to display, using the interface engine, in a human-readable format: the queried loan data; and tracking data, wherein the tracking data is based on: the blockchain's tracking of the aggregation of the loan data; and the blockchain's tracking of the normalization of the aggregated loan data.

The foregoing apparatus embodiment may include one or more of the following elements, either alone or in combination with one another:

The instructions that, when executed, cause the one or more processors to aggregate, using the ingestion engine, the loan data in the one or more databases include instructions that, when executed, cause the one or more processors to aggregate a first data set in a first database; and the instructions that, when executed, cause the one or more processors to track, using the blockchain, the ingestion engine's aggregation of the loan data in the one or more databases include instructions that, when executed, cause the one or more processors to track the aggregation of the first data set in the first database.

The instructions that, when executed, cause the one or more processors to aggregate, using the ingestion engine, the loan data in the one or more databases further include instructions that, when executed, cause the one or more processors to aggregate a second data set in a second database; and the instructions that, when executed, cause the one or more processors to track, using the blockchain, the ingestion engine's aggregation of the loan data in the one or more databases further include instructions that, when executed, cause the one or more processors to track the aggregation of the second data set in the second database.

The first data set includes one of: loan origination data and loan payment data; and the second data set includes the other of: loan origination data and loan payment data.

The instructions that, when executed, cause the one or more processors to normalize, using the transform engine, the aggregated loan data in the data warehouse include instructions that, when executed, cause the one or more processors to normalize the aggregated first data set with the aggregated second data set in the data warehouse; and the instructions that, when executed, cause the one or more processors to track, using the blockchain, the transform engine's normalization of the aggregated loan data include instructions that, when executed, cause the one or more processors to track the normalization of the aggregated first data set with the aggregated second data set.

The instructions that, when executed, cause the one or more processors to track, using the blockchain, the ingestion engine's aggregation of the loan data include: instructions that, when executed, cause the one or more processors to create a first block having a first trace denoting a source from which the loan data was obtained and a second trace denoting a location in the one or more databases in which the obtained loan data was stored upon aggregation; and instructions that, when executed, cause the one or more processors to add the first block to the blockchain; and the instructions that, when executed, cause the one or more processors to track, using the blockchain, the transform engine's normalization of the aggregated loan data include: instructions that, when executed, cause the one or more processors to create a second block having a third trace denoting the location in the one or more databases from which the aggregated loan data was obtained and a fourth trace denoting a location in the data warehouse in which the obtained aggregated loan data was stored upon normalization; and instructions that, when executed, cause the one or more processors to add the second block to the blockchain.

The instructions that, when executed, cause the one or more processors to track, using the blockchain, the ingestion engine's aggregation of the loan data further include instructions that, when executed, cause the one or more processors, prior to adding the first block to the blockchain, to verify, using multiple computing nodes in a network, the accuracy of the first block; and the instructions that, when executed, cause the one or more processors to track, using the blockchain, the transform engine's normalization of the aggregated loan data further include instructions that, when executed, cause the one or more processors, prior to adding the second block to the blockchain, to verify, using the multiple computing nodes in the network, the accuracy of the second block.

It is understood that variations may be made in the foregoing without departing from the scope of the present disclosure.

In some embodiments, the elements and teachings of the various embodiments may be combined in whole or in part in some or all of the embodiments. In addition, one or more of the elements and teachings of the various embodiments may be omitted, at least in part, and/or combined, at least in part, with one or more of the other elements and teachings of the various embodiments.

Any spatial references, such as, for example, "upper," "lower," "above," "below," "between," "bottom," "vertical," "horizontal," "angular," "upwards," "downwards," "side-to-side," "left-to-right," "right-to-left," "top-to-bottom," "bottom-to-top," "top," "bottom," "bottom-up," "top-down," etc., are for the purpose of illustration only and do not limit the specific orientation or location of the structure described above.

In some embodiments, while different steps, processes, and procedures are described as appearing as distinct acts, one or more of the steps, one or more of the processes, and/or one or more of the procedures may also be performed in different orders, simultaneously and/or sequentially. In some embodiments, the steps, processes, and/or procedures may be merged into one or more steps, processes and/or procedures.

In some embodiments, one or more of the operational steps in each embodiment may be omitted. Moreover, in some instances, some features of the present disclosure may be employed without a corresponding use of the other features. Moreover, one or more of the above-described embodiments and/or variations may be combined in whole or in part with any one or more of the other above-described embodiments and/or variations.

Although some embodiments have been described in detail above, the embodiments described are illustrative only and are not limiting, and those skilled in the art will readily appreciate that many other modifications, changes and/or substitutions are possible in the embodiments without materially departing from the novel teachings and advantages of the present disclosure. Accordingly, all such modifications, changes, and/or substitutions are intended to be included within the scope of this disclosure as defined in the following claims. In the claims, any means-plus-function clauses are intended to cover the structures described herein as performing the recited function and not only structural equivalents, but also equivalent structures. Moreover, it is the express intention of the borrower not to invoke 35 U.S.C. § 112, paragraph 6 for any limitations of any of the claims herein, except for those in which the claim expressly uses the word "means" together with an associated function.

What is claimed is:

1. A method for auditing loan data, the method comprising:
    tracking, using a blockchain, an aggregation of loan origination data in one or more databases by creating a first block in the blockchain, the first block having:
        a first trace denoting borrower and/or loan application from which the loan origination data was obtained; and
        a second trace denoting a location in the one or more databases in which the obtained loan origination data was stored upon aggregation;
    tracking, using the blockchain, an aggregation of loan payment data in the one or more databases by creating a second block in the blockchain, the second block having:
        a third trace denoting a lender and/or loan statement from which the loan payment data was obtained; and
        a fourth trace denoting a location in the one or more databases in which the obtained loan payment data was stored upon aggregation;
    tracking, using the blockchain, a normalization of the aggregated loan origination data with the aggregated loan payment data, and vice versa, into first, second, or third normal form in a data warehouse by creating a third block in the blockchain, the third block having:
        a fifth trace denoting the respective locations in the one or more databases from which the aggregated loan origination data and loan payment data were obtained; and
        a sixth trace denoting respective locations in the data warehouse in which the obtained aggregated loan origination data and loan payment data were stored upon normalization into the first, second, or third normal form;
    and
    outputting, in a human-readable format, at least respective portions of the aggregated and normalized loan origination data and loan payment data, together with:
        the first trace;
        the second trace;
        the third trace;
        the fourth trace;
        the fifth trace;
        the sixth trace; or
        any combination of the first, second, third, fourth, fifth, and sixth traces.

2. The method of claim 1,
    wherein:
        the aggregation of the loan origination data in the one or more databases comprises an aggregation of the loan origination data in a first database;
        the second trace denotes a location in the first database in which the obtained loan origination data was stored upon aggregation;
        the fifth trace denotes the location in the first database from which the aggregated loan origination data was obtained;
        the aggregation of the loan payment data in the one or more databases comprises an aggregation of the loan payment data in a second database;
        the fourth trace denotes a location in the second database in which the obtained loan payment data was stored upon aggregation; and
        the fifth trace further denotes the location in the second database from which the aggregated loan payment data was obtained.

3. The method of claim 1, further comprising:
    verifying, using multiple computing nodes in a network, the accuracy of the first block;
    verifying, using the multiple computing nodes in the network, the accuracy of the second block; and
    verifying, using the multiple computing nodes in the network, the accuracy of the third block.

4. A system for auditing loan data, the system comprising:
    one or more databases in which loan origination data and loan payment data are aggregated;
    a data warehouse in which the aggregated loan origination data and loan payment data is normalized into first, second, or third normal form;
    a blockchain that:
        tracks the aggregation of the loan origination data in the one or more databases by creating a first block in the blockchain, the first block having:
            a first trace denoting a borrower and/or loan application from which the loan origination data was obtained; and
            a second trace denoting a location in the one or more databases in which the obtained loan origination data was stored upon aggregation;
        tracks the aggregation of the loan payment data in the one or more databases by creating a second block in the blockchain, the second block having:
            a third trace denoting a lender and/or loan statement from which the loan payment data was obtained; and
            a fourth trace denoting a location in the one or more databases in which the obtained loan payment data was stored upon aggregation;
        and
        tracks the normalization of the aggregated loan origination data with the aggregated loan payment data, and vice versa, into the first, second, or third normal form in the data warehouse by creating a third block in the blockchain, the third block having:
            a fifth trace denoting the respective locations in the one or more databases from which the aggregated loan origination data and loan payment data were obtained; and
            a sixth trace denoting respective locations in the data warehouse in which the obtained aggregated loan origination data and loan payment data were stored upon normalization into the first, second, or third normal form;
    and
    an output device that outputs, in a human-readable format, at least respective portions of the aggregated and normalized loan origination data and loan payment data, together with:

the first trace;
the second trace;
the third trace;
the fourth trace;
the fifth trace;
the sixth trace; or
any combination of the first, second, third, fourth, fifth, and sixth traces.

5. The system of claim 4, wherein:
the aggregation of the loan origination data in the one or more databases comprises an aggregation of the loan origination data in a first database;
the second trace denotes a location in the first database in which the obtained loan origination data was stored upon aggregation;
the fifth trace denotes the location in the first database from which the aggregated loan origination data was obtained;
the aggregation of the loan payment data in the one or more databases comprises an aggregation of the loan payment data in a second database;
the fourth trace denotes a location in the second database in which the obtained loan payment data was stored upon aggregation; and
the fifth trace further denotes the location in the second database from which the aggregated loan payment data was obtained.

6. The system of claim 4, further comprising:
multiple computing nodes in a network;
wherein the multiple computing nodes:
verify the accuracy of the first block;
verify the accuracy of the second block; and
verify the accuracy of the third block.

7. An apparatus for auditing loan data, the apparatus comprising:
a non-transitory computer readable medium; and
a plurality of instructions stored on the non-transitory computer readable medium and executable by one or more processors, wherein, when the instructions are executed by the one or more processors, the following steps are executed:
tracking, using a blockchain, an aggregation of loan origination data in one or more databases by creating a first block in the blockchain, the first block having:
a first trace denoting a borrower and/or loan application from which the loan origination data was obtained; and
a second trace denoting a location in the one or more databases in which the obtained loan origination data was stored upon aggregation;
tracking, using the blockchain, an aggregation of loan payment data in the one or more databases by creating a second block in the blockchain, the second block having:
a third trace denoting a lender and/or loan statement from which the loan payment data was obtained; and
a fourth trace denoting a location in the one or more databases in which the obtained loan payment data was stored upon aggregation;
tracking, using the blockchain, a normalization of the aggregated loan origination data with the aggregated loan payment data, and vice versa, into first, second, or third normal form in a data warehouse by creating a third block in the blockchain, the third block having:
a fifth trace denoting the respective locations in the one or more databases from which the aggregated loan origination data and loan payment data were obtained; and
a sixth trace denoting respective locations in the data warehouse in which the obtained aggregated loan origination data and loan payment data were stored upon normalization into the first, second, or third normal form;
and
outputting, in a human-readable format, at least respective portions of the aggregated and normalized loan origination data and loan payment data, together with:
the first trace;
the second trace;
the third trace;
the fourth trace;
the fifth trace
the sixth trace; or
any combination of the first, second, third, fourth, fifth, and sixth traces.

8. The apparatus of claim 7, wherein:
the aggregation of the loan origination data in the one or more databases comprises an aggregation of the loan origination data in a first database;
the second trace denotes a location in the first database in which the obtained loan origination data was stored upon aggregation;
the fifth trace denotes the location in the first database from which the aggregated loan origination data was obtained;
the aggregation of the loan payment data in the one or more databases comprises an aggregation of the loan payment data in a second database;
the fourth trace denotes a location in the second database in which the obtained loan payment data was stored upon aggregation; and
the fifth trace further denotes the location in the second database from which the aggregated loan payment data was obtained.

9. The apparatus of claim 7, wherein, when the instructions are executed by the one or more processors, the following steps are also executed:
verifying, using multiple computing nodes in a network, the accuracy of the first block;
verifying, using the multiple computing nodes in the network, the accuracy of the second block; and
verifying, using the multiple computing nodes in the network, the accuracy of the third block.

* * * * *